(12) United States Patent
Kim et al.

(10) Patent No.: US 12,555,873 B2
(45) Date of Patent: Feb. 17, 2026

(54) PRESSURE JIG APPARATUS FOR BRINGING ELECTRODE LEAD INTO CLOSE CONTACT WITH BUS BAR AND BATTERY MODULE MANUFACTURING SYSTEM INCLUDING SAME

(71) Applicant: LG ENERGY SOLUTION, LTD., Seoul (KR)

(72) Inventors: Kyung-Mo Kim, Daejeon (KR); Jin-Yong Park, Daejeon (KR); Ho-June Chi, Daejeon (KR); Seung-Joon Kim, Daejeon (KR); Jeong-O Mun, Daejeon (KR); Hee-Jun Jin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/773,335

(22) Filed: Jul. 15, 2024

(65) Prior Publication Data

US 2024/0372225 A1    Nov. 7, 2024

Related U.S. Application Data

(62) Division of application No. 17/270,241, filed as application No. PCT/KR2019/016507 on Nov. 27, 2019, now Pat. No. 12,068,503.

(30) Foreign Application Priority Data

Dec. 21, 2018    (KR) ........................ 10-2018-0167940

(51) Int. Cl.
*H01M 50/505* (2021.01)
*B23K 37/04* (2006.01)
(Continued)

(52) U.S. Cl.
CPC ....... *H01M 50/505* (2021.01); *B23K 37/0443* (2013.01); *H01M 50/178* (2021.01);
(Continued)

(58) Field of Classification Search
CPC ............. H01M 50/505; H01M 50/178; H01M 50/209; H01M 50/50; H01M 50/536;
(Continued)

(56) References Cited

U.S. PATENT DOCUMENTS

| 9,136,521 | B2 | 9/2015 | Lee et al. |
| 2015/0000117 | A1 | 1/2015 | Cho et al. |
(Continued)

FOREIGN PATENT DOCUMENTS

| CN | 107009026 A | 8/2017 |
| CN | 110350136 A | 10/2019 |
(Continued)

OTHER PUBLICATIONS

International Search Report (PCT/ISA/210) issued in PCT/KR2019/016507, dated Mar. 23, 2020.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

Discussed is a battery module manufacturing system including a battery module having a cell stack formed by stacking a plurality of battery cells, a module case configured to accommodate the cell stack and a bus bar frame configured to cover an opening at one side of the module case, a fixing
(Continued)

frame coupled to one side of the battery module so that the bus bar frame is exposed to the outside, and at least one pressing jig apparatus coupled onto the fixing frame and configured to press electrode leads of the plurality of battery cells so that the electrode leads are welded in close contact with both sides of a bus bar provided to the bus bar frame.

10 Claims, 7 Drawing Sheets

(51) Int. Cl.
*H01M 10/04* (2006.01)
*H01M 50/178* (2021.01)
*H01M 50/209* (2021.01)
*H01M 50/50* (2021.01)
*H01M 50/536* (2021.01)
*H01M 50/55* (2021.01)
*H01M 50/553* (2021.01)

(52) U.S. Cl.
CPC ......... *H01M 50/209* (2021.01); *H01M 50/50* (2021.01); *H01M 50/536* (2021.01); *H01M 50/55* (2021.01); *H01M 50/553* (2021.01); *H01M 10/0404* (2013.01)

(58) Field of Classification Search
CPC ............... H01M 50/55; H01M 50/553; H01M 10/0404; H01M 50/516; B23K 37/0443
See application file for complete search history.

(56) References Cited

U.S. PATENT DOCUMENTS

| | | | |
|---|---|---|---|
| 2016/0233476 A1 | 8/2016 | Okamoto et al. | |
| 2019/0074490 A1* | 3/2019 | Ishimaru | H01M 50/507 |
| 2019/0321945 A1 | 10/2019 | Jung et al. | |
| 2020/0368855 A1 | 11/2020 | Kim et al. | |

FOREIGN PATENT DOCUMENTS

| | | | |
|---|---|---|---|
| EP | 3367471 A1 | 8/2018 |
| JP | 2000-67843 A | 3/2000 |
| JP | 2004-255490 A | 9/2004 |
| JP | 2013-101860 A | 5/2013 |
| JP | 5197001 B2 | 5/2013 |
| JP | 2017-4846 A | 1/2017 |
| KR | 10-1023184 B1 | 3/2011 |
| KR | 10-2012-0121346 A | 11/2012 |
| KR | 10-2014-0086907 A | 7/2014 |
| KR | 10-2016-0043038 A | 4/2016 |
| KR | 10-1693790 B1 | 1/2017 |
| KR | 10-1750597 B1 | 6/2017 |
| KR | 10-2017-0095067 A | 8/2017 |
| KR | 10-2018-0082914 A | 7/2018 |
| KR | 10-2018-0119372 A | 11/2018 |

OTHER PUBLICATIONS

Supplementary European Search Report dated Sep. 15, 2021 for Application No. EP 19900601.6.

* cited by examiner

PRESSURE JIG APPARATUS FOR BRINGING ELECTRODE LEAD INTO CLOSE CONTACT WITH BUS BAR AND BATTERY MODULE MANUFACTURING SYSTEM INCLUDING SAME

CROSS-REFERENCE TO RELATED APPLICATIONS

This application is a Divisional of U.S. patent application Ser. No. 17/270,241, filed on Feb. 22, 2021, which is the U.S. National Phase of PCT/KR2019/016507, filed Nov. 27, 2019 and which claims priority under 35 U.S.C. § 119(a) to Korean Patent Application No. 10-2018-0167940, filed on Dec. 21, 2018 in the Republic of Korea, the entire contents of which are hereby expressly incorporated by reference into the present application.

BACKGROUND

Field

The present disclosure relates to a pressing jig apparatus closely contacting an electrode lead to a bus bar and a battery module manufacturing system including the pressing jig apparatus, and more particularly, to a pressing jig apparatus used to closely contact electrode lead groups of a plurality of battery cell stack groups to a bus bar simultaneously and a battery module manufacturing system including the pressing jig apparatus.

Discussion of the Related Art

In a conventional battery module, a bus bar is used for electrically connecting stacked battery cells to each other, and a plurality of electrode leads respectively drawn out from the plurality of battery cells are bent and positioned on the bus bar, followed by welding.

If the battery module is manufactured in this way, in a state where the bent electrode lead is positioned on the bus bar, the electrode lead is pressed toward the bus bar by using a jig so that the electrode lead is in close contact with the bus bar, and then laser is irradiated onto the electrode lead to perform welding thereto.

Referring to FIGS. 1 and 2, there is shown a conventional battery module in which a plurality of pouch-type battery cells are electrically connected by a bus bar.

The conventional battery module is manufactured by inserting each electrode lead 2 drawn from a plurality of pouch-type battery cells 1 into a lead slit 4 of a bus bar 3 as shown in FIG. 1, and then bending the inserted electrode lead 2 to be in close contact with the bus bar 3 and then performing welding thereto as shown in FIG. 2.

However, in the conventional battery module as described above, in addition to the process of inserting the electrode lead 2 into the lead slit 4 of the bus bar 3 and the process of welding the electrode lead 2 to the bus bar 3, the process of bending the electrode lead 2 is additionally required, which makes the process complicated.

In addition, if the cell applied to the battery module is a pouch-type cell, as the cell has a smaller thickness, the electrode lead is also manufactured to have a shorter length. If the electrode lead is shortened as above, the bonding area between the electrode lead and the bus bar is also reduced to lower the bonding strength, thereby increasing the possibility of product failure.

Thus, it is required to develop a battery module structure in which the electrode lead bending process may be omitted, and accordingly, a new pressing jig for welding, which is suitable for the bonding structure of the electrode lead and the bus bar is also required.

SUMMARY OF THE DISCLOSURE

The present disclosure is designed to solve the problems of the related art, and therefore the present disclosure is directed to providing a pressing jig apparatus for welding, which is configured to closely contact an electrode lead group to a bus bar so that the bus bar is welded to an electrode lead in close contact with each other, in manufacturing a battery module in which the electrode lead is coupled to the bus bar by welding without being bent for the coupling with the bus bar.

In addition, the present disclosure is directed to preventing a weld pool generated during a welding process between the electrode lead group and the bus bar from adhering to the pressing jig apparatus by changing the contact position of the pressing tip and the electrode lead group of the pressing jig apparatus and the shape of the pressing tip.

However, the technical problem to be solved by the present disclosure is not limited to the above, and other objects not mentioned herein will be clearly understood by those skilled in the art from the following description.

In one aspect of the present disclosure, there is provided a battery module manufacturing system, comprising: a battery module having a cell stack formed by stacking a plurality of battery cells, a module case configured to accommodate the cell stack and a bus bar frame configured to cover an opening at one side of the module case; a fixing frame coupled to one side of the battery module so that the bus bar frame is exposed to the outside; and at least one pressing jig apparatus coupled onto the fixing frame and configured to press an electrode lead of the battery cell so that the electrode lead is welded in close contact with both sides of a bus bar provided to the bus bar frame.

The pressing jig apparatus may include a first frame and a second frame, and the first frame and the second frame may be coupled to be rotatable relative to each other based on a rotary shaft fastened to one longitudinal end thereof.

The first frame may include a first pressing tip provided at the other longitudinal end thereof and configured to press a lead group of a first unit cell stack provided in the cell stack so that the lead group comes into close contact with one side of the bus bar, and the second frame may include a second pressing tip provided at the other longitudinal end thereof to face the first pressing tip and configured to press a lead group of a second unit cell stack provided in the cell stack so that the lead group comes into close contact with the other side of the bus bar.

The first pressing tip and the second pressing tip may press the lead group at positions corresponding to a region below vertical centers of one side surface and the other side surface of the bus bar.

The first pressing tip and the second pressing tip may be shaped such that surfaces thereof facing the lead group have chamfered upper portions.

The pressing jig apparatus may include an elastic member connected between the first frame and the second frame to apply a force so that the first frame and the second frame move closer to each other.

The pressing jig apparatus may include a lead protrusion-preventing unit fixed between the first frame and the second frame to press the electrode lead downward so that the electrode lead does not protrude upward further to an upper surface of the bus bar.

The lead protrusion-preventing unit may include a pair of horizontal bars spaced apart from each other and configured to extend side by side; and a barrier configured to connect centers of the pair of horizontal bars, wherein the horizontal bars may press the electrode lead downward.

Meanwhile, in another aspect of the present disclosure, there is also provided a pressing jig apparatus for welding, which is installed at one side of a battery module having a cell stack formed by stacking a plurality of battery cells and presses an electrode lead so that the electrode lead is welded in close contact with both sides of a bus bar provided to the battery module, the pressing jig apparatus comprising: a first frame; and a second frame coupled to face the first frame and to be rotatable relative to the first frame, wherein the first frame includes a first pressing tip provided at on longitudinal end thereof and configured to press a lead group of a first unit cell stack provided in the cell stack so that the lead group comes into close contact with one side of the bus bar, and wherein the second frame includes a second pressing tip provided at one longitudinal end thereof to face the first pressing tip and configured to press a lead group of a second unit cell stack provided in the cell stack so that the lead group comes into close contact with the other side of the bus bar.

According to an embodiment of the present disclosure, the electrode lead may be coupled to with the bus bar by welding in an unbent state, so that the electrode lead is not exposed above the bus bar, thereby reducing the risk of breakage of the weld area between the electrode lead and the bus bar.

In addition, according to another embodiment of the present disclosure, it is possible to prevent that the pressing jig apparatus is contaminated since the weld pool of the electrode lead group adheres to the pressing tip of the pressing jig apparatus during welding for bonding the electrode lead group and the bus bar.

DETAILED DESCRIPTION OF THE EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
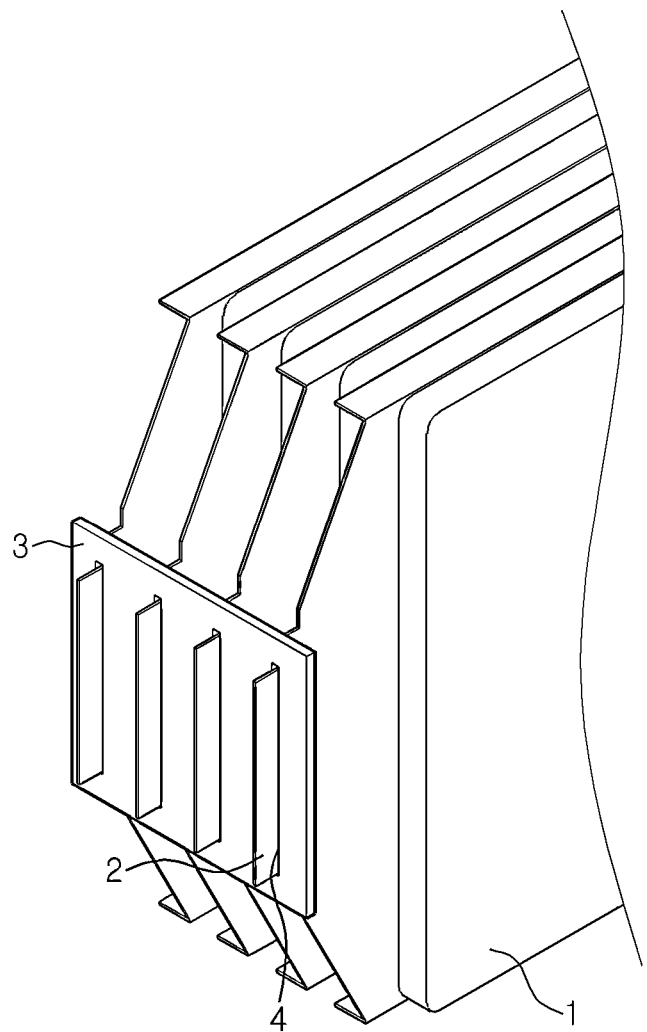
FIGS. 1 and 2 are diagrams for illustrating a process of coupling an electrode lead and a bus bar in a conventional battery module manufacturing system.
Figure 2:
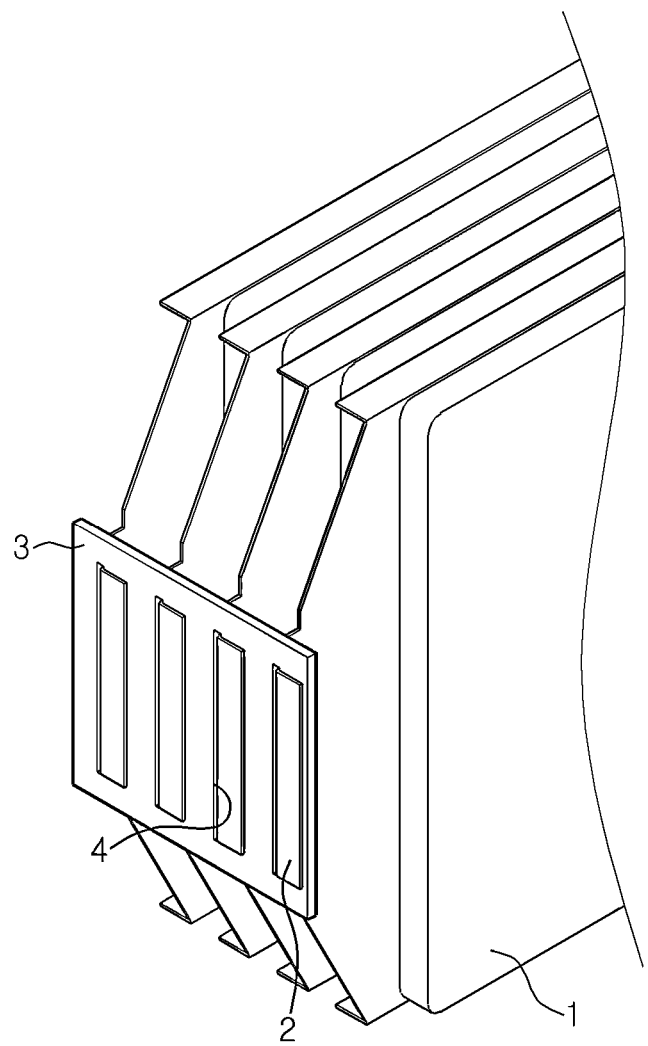
Figure 3:
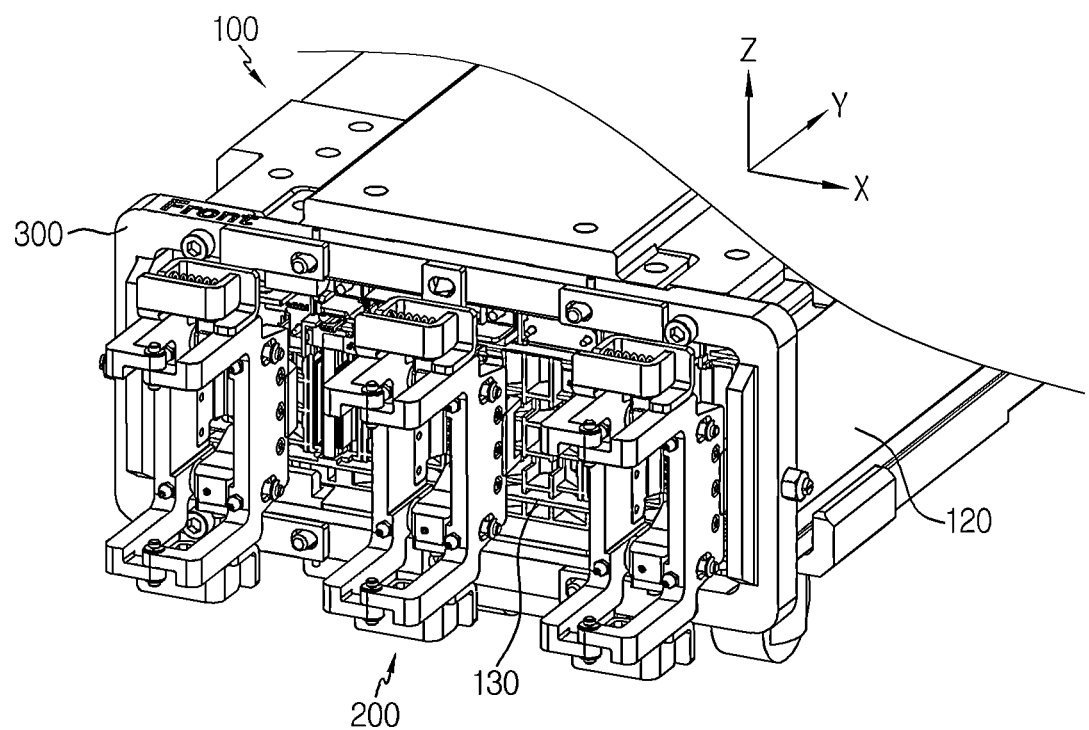
FIG. 3 is a perspective view showing a battery module manufacturing system according to an embodiment of the present disclosure.

First, referring to FIG. 3, a battery module manufacturing system according to an embodiment of the present disclosure may be implemented to include a battery module 100, a pressing jig apparatus 200 and a fixing frame 300.

Figure 4:
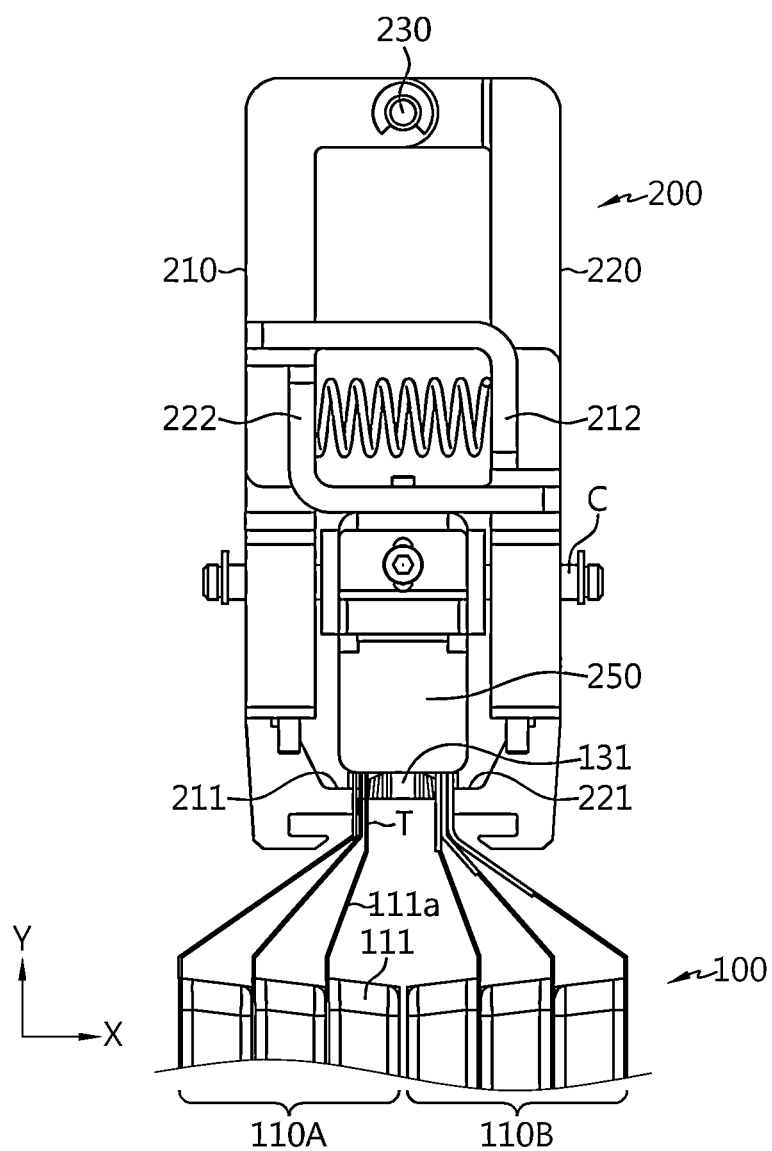
FIG. 4 is a diagram showing a state where the pressing jig apparatus according to an embodiment of the present disclosure presses a lead group to be in close contact with a bus bar.

Referring to FIGS. 3 and 4, the battery module 100 includes a cell stack 110, a module case 120 for accommodating the cell stack 110, and a bus bar frame 130 for covering an opening at one side of the module case 120.

The cell stack 110 includes a first unit cell stack 110A and a second unit cell stack 110B located adjacent thereto. In the figures of the present disclosure, only two unit cell stacks are shown. However, the present disclosure is not limited to the number of unit cell stacks, and the number of unit cell stacks may be selected as being two or more without limitation. In addition, the present disclosure shows only one case in which one unit cell stack has three battery cells 111. However, the number of battery cells 111 included in one unit cell stack is not limited thereto, and the cell stack may have two battery cells or four or more battery cells.

Each of the unit cell stacks 110A, 110B is formed by stacking a plurality of battery cells 111 to face each other, and each of the battery cells 111 stacked to form one unit cell stack has an electrode lead 111a.

The electrode leads 111a provided in the battery cells 111 of any one unit cell stack 110A, 110B are collected into one group, thereby forming one lead group T.

An lead group T formed by collecting the electrode leads 111a drawn from the same unit cell stack is exposed to an upper surface of the bus bar frame 130 (a surface parallel to the X-Z plane of FIG. 3) through a lead slit (not shown) or a lead penetration hole (not shown) formed in the bus bar frame 130. The lead group T exposed as above comes into close contact with the bus bar 131 fixed to the upper surface of the bus bar frame 130.

More specifically, the lead group T provided in the first unit cell stack 110A is in close contact with one side surface of the bus bar 131, and the lead group T provided in the second unit cell stack 110B is in close contact with the other side surface of the bus bar 131. The close contact of the lead group T is made by pressing of the jig apparatus 200, and the lead group T is welded in close contact with the bus bar 131 and thus bonded to the bus bar 131.

The lead groups T of neighboring unit cell stacks 110A, 110B may be electrically connected to each other by means of one bus bar 131.

Figure 5:
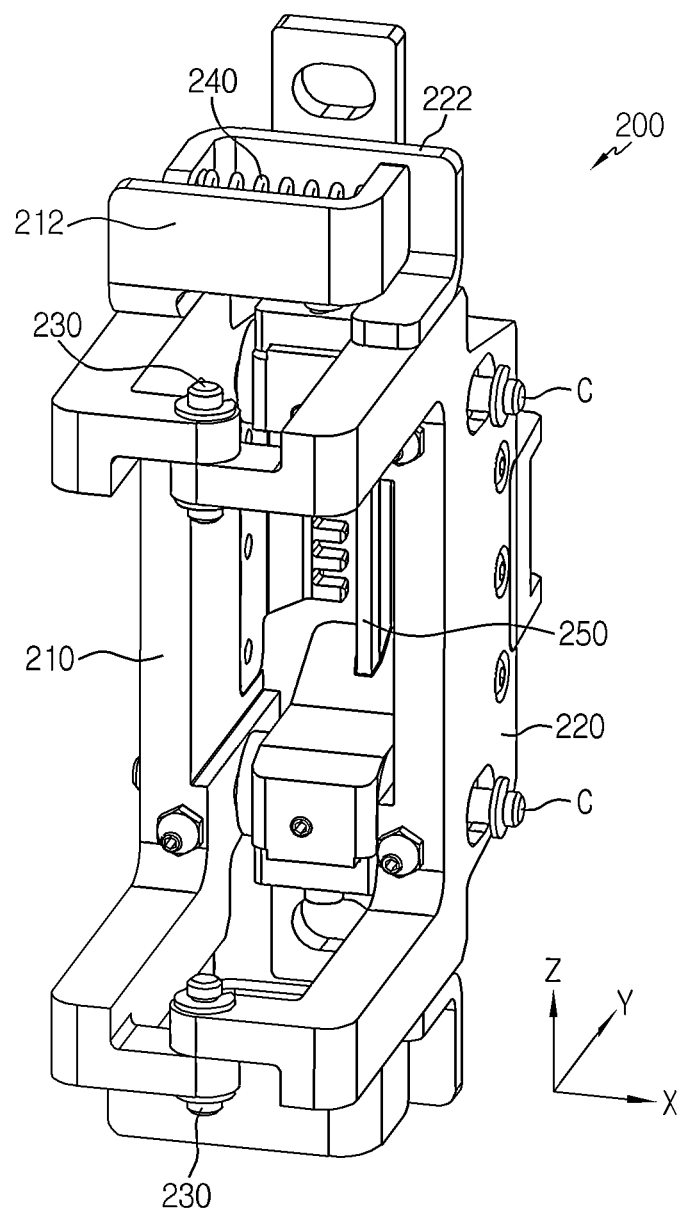
FIG. 5 is a perspective view showing a pressing jig apparatus according to an embodiment of the present disclosure.
Figure 6:
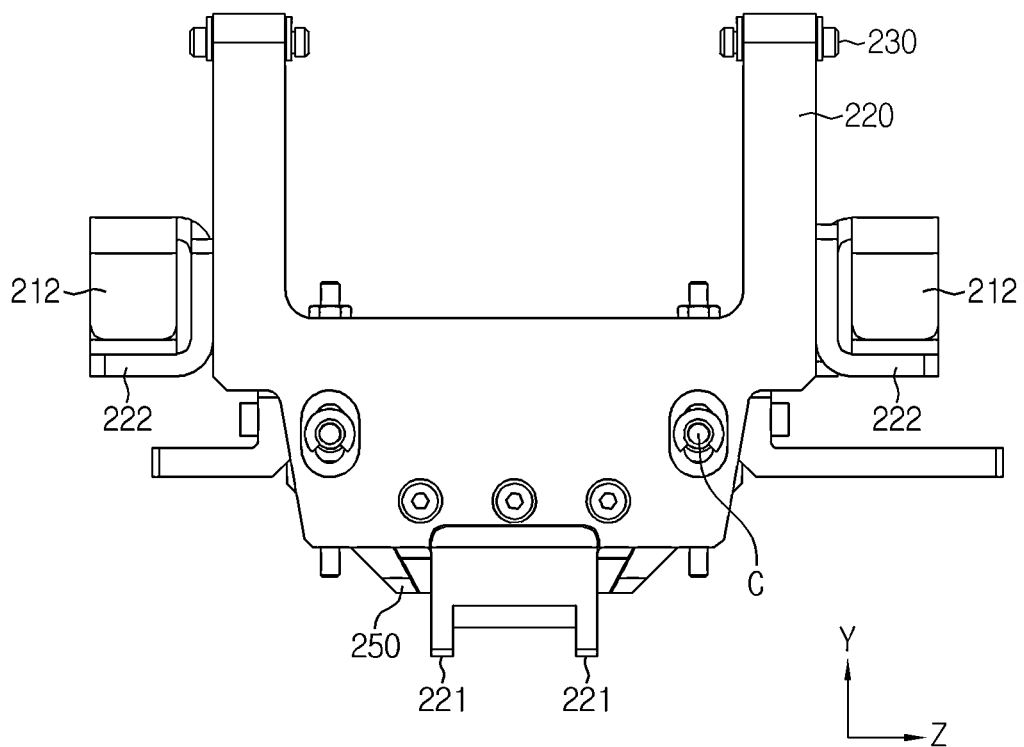
FIG. 6 is a top view showing one surface of the pressing jig apparatus according to an embodiment of the present disclosure.

Referring to FIGS. 3 and 4, the pressing jig apparatus 200 is disposed at one side of the battery module 100 to press the lead groups T of the neighboring unit cell stacks 110A, 110B so that the lead groups T are in close contact with one side surface and the other side surface of the bus bar 131, respectively. Referring to FIGS. 4 to 6, the pressing jig apparatus 200 may be implemented to include a first frame 210, a second frame 220, a rotary shaft 230, an elastic member 240, and a lead protrusion-preventing unit 250.

The first frame 210 and the second frame 220 are coupled to be rotatable relative to each other by means of the rotary shaft 230 fastened through one end thereof in the longitudinal direction (a direction parallel to the Y-axis of FIG. 4) The first frame 210 and the second frame 220 are rotated about one longitudinal end so that the other ends thereof become closer to or farther from each other. One rotary shaft 230 may be provided to each of both side ends in the width direction (a direction parallel to the Z-axis of FIG. 5) for stable operation of the pressing jig apparatus 200.

The first frame 210 includes a first pressing tip 211 and a first sub frame 212. The first pressing tip 211 is provided at the other longitudinal end of the first frame 210, namely at a side opposite to the coupling portion of the first frame 210 and the second frame 220.

The first pressing tip 211 moves toward the second frame 220 by the relative rotation between the first frame 210 and the second frame 220 to press the lead group T provided to the first unit cell stack 110A so that the lead group T comes into close contact with one side surface of the bus bar 131.

The first sub frame 212 is provided between one longitudinal end and the other longitudinal end of the first frame 210 and extends in a direction (parallel to the X-axis of FIG. 4) substantially perpendicular to the longitudinal direction of the first frame 210. In addition, the first sub frame 212 is shaped such that its end is bent upwardly or downwardly (in a direction parallel to the Y-axis of FIG. 4). The bent end of the first sub frame 212 serves as a support surface for supporting the elastic member 240. One first sub frame 212 may be formed at each of both side ends of the pressing jig apparatus 200 in the width direction (a direction parallel to the Y-axis of FIG. 4).

Similar to the first frame 210, the second frame 220 includes a second pressing tip 221 and a second sub frame 222. The second pressing tip 221 is provided at the other longitudinal end of the second frame 220, namely at a side opposite to the coupling portion of the first frame 210 and the second frame 220.

The second pressing tip 221 is moved toward the first frame 220 by the relative rotation of the first frame 210 and the second frame 220 to press the lead group T provided to the second unit cell stack 110B so that the lead group T comes into close contact with the other side surface of the bus bar 131.

The second sub frame 222 is provided between one longitudinal end and the other longitudinal end of the second frame 220 and extends in a direction (parallel to the X-axis of FIG. 4) substantially perpendicular to the longitudinal direction of the second frame 220. In addition, the second sub frame 222 is shaped such that its end is bent downward or upward (in a direction parallel to the Y-axis of FIG. 4), but in a direction opposite to the end of the first sub frame 212.

The bent end of the second sub frame 222 serves as a support surface for supporting the elastic member 240. That is, the support surface formed by the end of the first sub frame 212 and the support surface formed by the end of the second sub frame 222 are arranged side by side, and the elastic member 240 is interposed therebetween. One second sub frame 222 may be formed at each of both side ends of the pressing jig apparatus 200 in the width direction (a direction parallel to the Y-axis of FIG. 4).

The elastic member 240 may be, for example, a spring. One side of the elastic member 240 in the longitudinal direction (the X-axis direction of FIG. 4) is coupled on the support surface formed by the end of the second sub frame 222, and the other side thereof is coupled on the support surface formed by the end of the first sub frame 212.

In addition, the elastic member 240 has a length shorter than a distance between the end of the first sub frame 212 and the end of the second sub frame 222 without an external force applied. Due to the length of the elastic member 240, the elastic member 240 is coupled between the pair of sub frames 212, 222 in a state where the length of the elastic member 240 is elongated, and thus the elastic restoring force of the elastic member 240 is applied so that the first frame 210 and second frame 220 move closer to each other.

Thus, a user of the pressing jig apparatus 200 may apply a force in a direction in which the first pressing tip 211 and the second pressing tip 221 move away from each other so that the bus bar 231 and the lead group T are located between the first pressing tip 211 and the second pressing tip 221, and then removes the applied force so that the lead group T is brought into close contact with the bus bar 231. That is, the magnitude of the pressing force applied by the first pressing tip 211 and the second pressing tip 221 to the lead group T is proportional to the elastic restoring force of the elastic member 240.

Figure 7:
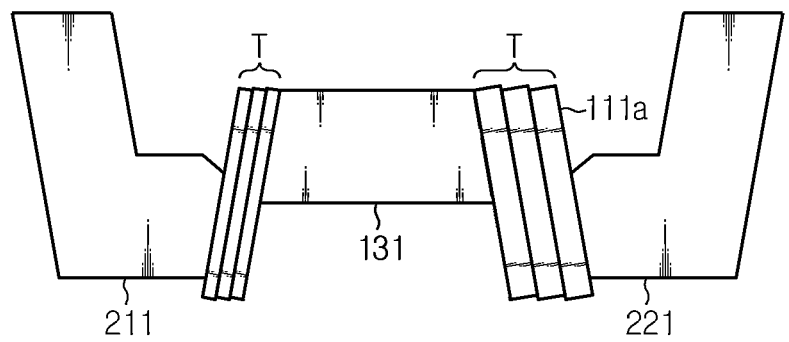
FIG. 7 is a diagram specifically showing the position relationship among a pressing tip, a lead group and a bus bar provided to the pressing jig apparatus according to an embodiment of the present disclosure and the shape of the pressing tip.
Figure 8:
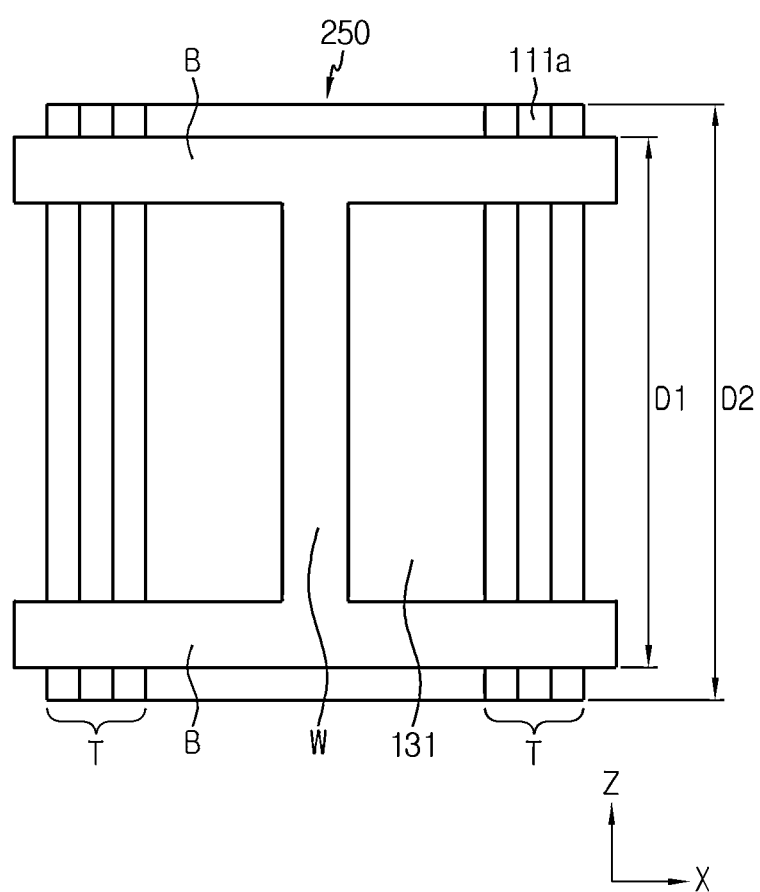
FIG. 8 is a diagram showing that the lead group does not protrude upward further to an upper surface of the bus bar by means of a lead protrusion-preventing unit, in the pressing jig apparatus according to an embodiment of the present disclosure.

Referring to FIG. 7, the first pressing tip 211 and the second pressing tip 221 press the pair of lead groups T provided to the unit cell stacks 110A, 110B adjacent to each other so that the pair of lead groups T come into close contact with both side surfaces of the bus bar 131. Here, the first pressing tip 211 and the second pressing tip 221 may perform the pressing at positions corresponding to a region below vertical centers of one side surface and the other side surface of the bus bar 131. This is to prevent a weld pool of the electrode lead 111a, formed when the lead group T is welded in close contact with the bus bar 131, from adhering to the pressing tips 211, 221.

In addition, surfaces of the first pressing tip 211 and the second pressing tip 221 facing the lead group T may have chamfered upper portions. This is also to prevent the weld pool from adhering to the pressing tips 211, 221.

If the weld pool adheres to the pressing tips 211, 221, when the pressing tips 211, 221 are detached from the lead group T, the lead group T may receive a force to damage the welding portion between the lead group T and the bus bar 131. In addition, after a certain number of welding processes are be performed, a process of removing the adhered weld pool should be additionally performed. Thus, the pressing jig apparatus 200 according to the present disclosure is intended to solve this problem by improving the pressing positions of the pressing tips 211, 221 and the shape of the pressing tips 211, 221.

Referring to FIGS. 4 to 7, the lead protrusion-preventing unit 250 is fixed between the first frame 210 and the second frame 220 by a coupling rod C to press the lead group T downward so that the lead group T does not protrude upward further to the upper surface of the bus bar 131.

A pair of horizontal bars B spaced apart from each other and extending side by side and a barrier W connecting the centers of the pair of horizontal bars B to each other are provided at the end of the lead protrusion-preventing unit 250. The horizontal bar B and the barrier W extend substantially perpendicular to each other, so that the end of the lead protrusion-preventing unit 250 has an H beam shape.

The horizontal bar B contacts the lead group T and presses the lead group T directly so that the lead group T does not protrude above the upper surface of the bus bar 131. A distance D1 between outer edge portions of the pair of horizontal bars B is equal to or shorter than a width D2 of the lead group T. This allows the horizontal bar B to contact the lead group T when the lead protrusion-preventing unit 250 moves downward toward the bus bar 131.

The longitudinal ends the pair of horizontal bars B respectively press both ends of the lead group T in the width direction.

In a state where the horizontal bar B presses the lead group T from the top so that the lead group T does not protrude further above the upper surface of the bus bar 131 as described above, the lead group T and the bus bar 131 may be welded to each other by irradiating a laser or approaching a welding rod through openings formed at both sides of the barrier W.

That is, the openings formed at both sides of the barrier W are in communication with the openings formed at the upper portion of the pressing jig apparatus 200, thereby providing a space where a welding rod or a laser beam approaches along a direction toward the lead group T (a direction parallel to the Y-axis of FIG. 4) from the upper portion of the pressing jig apparatus 200.

Meanwhile, referring to FIG. 3 again, the fixing frame 300 is coupled to one side of the battery module 100 so that the bus bar frame 130 is exposed to the outside. The fixing frame 300 functions as a support to which the pressing jig apparatus 200 is fixed.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module manufacturing system, comprising:
   a battery module having a cell stack formed by stacking a plurality of battery cells, a module case configured to accommodate the cell stack and a bus bar frame configured to cover an opening at one side of the module case;
   a fixing frame coupled to one side of the battery module so that the bus bar frame is exposed to the outside; and
   at least one pressing jig apparatus coupled onto the fixing frame and configured to press electrode leads of the plurality of battery cells so that the electrode leads are welded in close contact with both sides of a bus bar provided to the bus bar frame,
   wherein the pressing jig apparatus includes a first frame and a second frame, and
   wherein the first frame and the second frame are coupled to be rotatable relative to each other based on a rotary shaft fastened to one longitudinal end thereof.

2. The battery module manufacturing system according to claim 1, wherein the first frame includes a first pressing tip provided at the other longitudinal end thereof and configured to press a first lead group of a first unit cell stack provided in the cell stack so that the first lead group comes into close contact with one side of the bus bar, and wherein the second frame includes a second pressing tip provided at the other longitudinal end thereof to face the first pressing tip and configured to press a second lead group of a second unit cell stack provided in the cell stack so that the second lead group comes into close contact with the other side of the bus bar.

3. The battery module manufacturing system according to claim 2, wherein the first pressing tip and the second pressing tip respectively press the first lead group and the second lead group at positions corresponding to a region below vertical centers of one side surface and the other side surface of the bus bar.

4. The battery module manufacturing system according to claim 3, wherein the first pressing tip and the second pressing tip are shaped such that surfaces thereof facing the first lead group and the second lead group have chamfered upper portions.

5. The battery module manufacturing system according to claim 1, wherein the pressing jig apparatus includes an elastic member connected between the first frame and the second frame to apply a force thereof so that the first frame and the second frame move closer to each other.

6. The battery module manufacturing system according to claim 1, wherein the pressing jig apparatus includes a lead protrusion-preventing unit fixed between the first frame and the second frame to press the electrode leads downward so that the electrode leads do not protrude upward further to an upper surface of the bus bar.

7. The battery module manufacturing system according to claim 6, wherein the lead protrusion-preventing unit includes:
   a pair of horizontal bars spaced apart from each other and configured to extend side by side; and
   a barrier configured to connect centers of the pair of horizontal bars,
   wherein the pair of horizontal bars press the electrode lead downward.

8. The battery module manufacturing system according to claim 2, wherein each of the first lead group and the second lead group includes at least two electrode leads that are welded together.

9. The battery module manufacturing system according to claim 2, wherein the first frame further includes a first sub frame and the second frame further includes a second sub frame,
   wherein first sub frame is provided between the one longitudinal end and the other longitudinal end of the first frame and extends in a direction substantially perpendicular to a longitudinal direction of the first frame, and
   wherein the second sub frame is provided between the one longitudinal end and the other longitudinal end of the second frame and extends in a direction substantially perpendicular to a longitudinal direction of the second frame.

10. The battery module manufacturing system according to claim 9, wherein the first sub frame is shaped such that an end of the first sub frame is bent upwardly or downwardly, and
   wherein the second sub frame is shaped such that an end of the second sub frame is bent downward or upward in a direction opposite to the end of the first sub frame.

* * * * *